United States Patent
Balakrishnan et al.

(10) Patent No.: US 12,517,902 B2
(45) Date of Patent: *Jan. 6, 2026

(54) USER DEFINED FUNCTION MEMOIZATION

(71) Applicant: Snowflake Inc., Bozeman, MT (US)

(72) Inventors: Raja Suresh Krishna Balakrishnan, Fremont, CA (US); Thierry Cruanes, San Mateo, CA (US); Yujie Li, Santa Clara, CA (US); Subramanian Muralidhar, Mercer Island, WA (US); David Schultz, Piedmont, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/477,694

(22) Filed: Sep. 29, 2023

(65) Prior Publication Data

US 2024/0028591 A1     Jan. 25, 2024

Related U.S. Application Data

(63) Continuation of application No. 17/819,758, filed on Aug. 15, 2022, now Pat. No. 11,809,425.

(60) Provisional application No. 63/366,036, filed on Jun. 8, 2022.

(51) Int. Cl.
    *G06F 16/2453*     (2019.01)
    *G06F 21/53*     (2013.01)

(52) U.S. Cl.
    CPC ........ *G06F 16/24539* (2019.01); *G06F 21/53* (2013.01); *G06F 2221/034* (2013.01)

(58) Field of Classification Search
    CPC ............... G06F 16/24539; G06F 21/53; G06F 2221/034; G06F 21/6227
    See application file for complete search history.

(56) References Cited

U.S. PATENT DOCUMENTS

| | | |
|---|---|---|
| 8,793,241 B2 | 7/2014 | Koch et al. |
| 10,997,286 B1 | 5/2021 | Brossard et al. |
| 11,288,361 B1 | 3/2022 | Salehpour et al. |

(Continued)

OTHER PUBLICATIONS

"U.S. Appl. No. 17/819,758, Non Final Office Action mailed Oct. 31, 2022", 12 pages.
"U.S. Appl. No. 17/819,758, Non Final Office Action mailed Dec. 14, 2022", 12 pages.

(Continued)

*Primary Examiner* — Beemnet W Dada
(74) *Attorney, Agent, or Firm* — Schwegman Lundberg & Woessner, P.A.

(57) ABSTRACT

A data platform that implements memoizable functions for database objects. The data platform detects a first execution of a memoizable function and generates a first key based on metadata of one or more database objects operated on by the memoizable function and generates a first result for the memoizable function based on the one or more database objects. The data platform detects a second execution of the memoizable function and generates a second key based on the metadata of the one or more database objects operated on by the memoizable function. When the first key and the second key are equal, the data platform reuses the first result of the memoizable function. When the first key and second key do not match, the data platform generates a second result for the second execution of the memoizable function.

30 Claims, 7 Drawing Sheets

(56) References Cited

U.S. PATENT DOCUMENTS

| | | |
|---|---|---|
| 11,334,548 B2 | 5/2022 | Kuimelis et al. |
| 11,809,425 B1 | 11/2023 | Balakrishnan et al. |
| 2003/0055813 A1* | 3/2003 | Chaudhuri ........ G06F 16/24545 |
| 2009/0049421 A1* | 2/2009 | Meijer .................. G06F 9/4486 |
| | | 717/100 |
| 2009/0327254 A1 | 12/2009 | Bruno et al. |
| 2011/0302371 A1 | 12/2011 | Lysko |
| 2012/0331249 A1 | 12/2012 | Benjamin et al. |
| 2013/0085882 A1 | 4/2013 | Gounares et al. |
| 2017/0177486 A1 | 6/2017 | Horn |
| 2017/0371940 A1 | 12/2017 | Chintakayala et al. |
| 2021/0135854 A1 | 5/2021 | Karame et al. |
| 2021/0191942 A1 | 6/2021 | Arnold |
| 2022/0206816 A1 | 6/2022 | Soundararajan et al. |
| 2022/0229916 A1 | 7/2022 | Soman et al. |

OTHER PUBLICATIONS

"U.S. Appl. No. 17/819,758, Response filed Mar. 14, 2023 to Non Final Office Action mailed Dec. 14, 2022", 11 pages.

"U.S. Appl. No. 17/819,758, Final Office Action mailed Apr. 4, 2023", 15 pages.

"U.S. Appl. No. 17/819,758, Response filed Jun. 30, 2023 to Final Office Action mailed Apr. 4, 2023", 11 pages.

"U.S. Appl. No. 17/819,758, Notice of Allowance mailed Aug. 9, 2023", 10 pages.

Christie, Alan M., "Software Process Automation: The Technology and Its Adoption", https: books.google.combooks?hl=enU andlr= andid=WcqoCAAAQBAJandoi=fndandpg=PA1anddq= andid=WcqoCAAAQBAJandoi=fndandpg=PA1anddq= info:mrbs7qfiMDgJ:scholar.google.com+andots=KTqCr_STf4andsig= GrOJ60-b D EdYTK7fA8Y_74s Dsh l#v=onepageandq =expandandf= false, 1 page.

* cited by examiner

USER DEFINED FUNCTION MEMOIZATION

CROSS-REFERENCE TO RELATED APPLICATIONS

This application is a Continuation of U.S. patent application Ser. No. 17/819,758, filed Aug. 15, 2022, which claims the benefit of priority to U.S. Provisional Patent Application Ser. No. 63/366,036, filed Jun. 8, 2022, the contents of which are incorporated herein by reference in their entireties.

TECHNICAL FIELD

Examples of the disclosure relate generally to databases and, more specifically, to memoizable functions in a database system.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

There are a number of scenarios where database users desire a convenient and robust method of reusing information extracted from a database.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
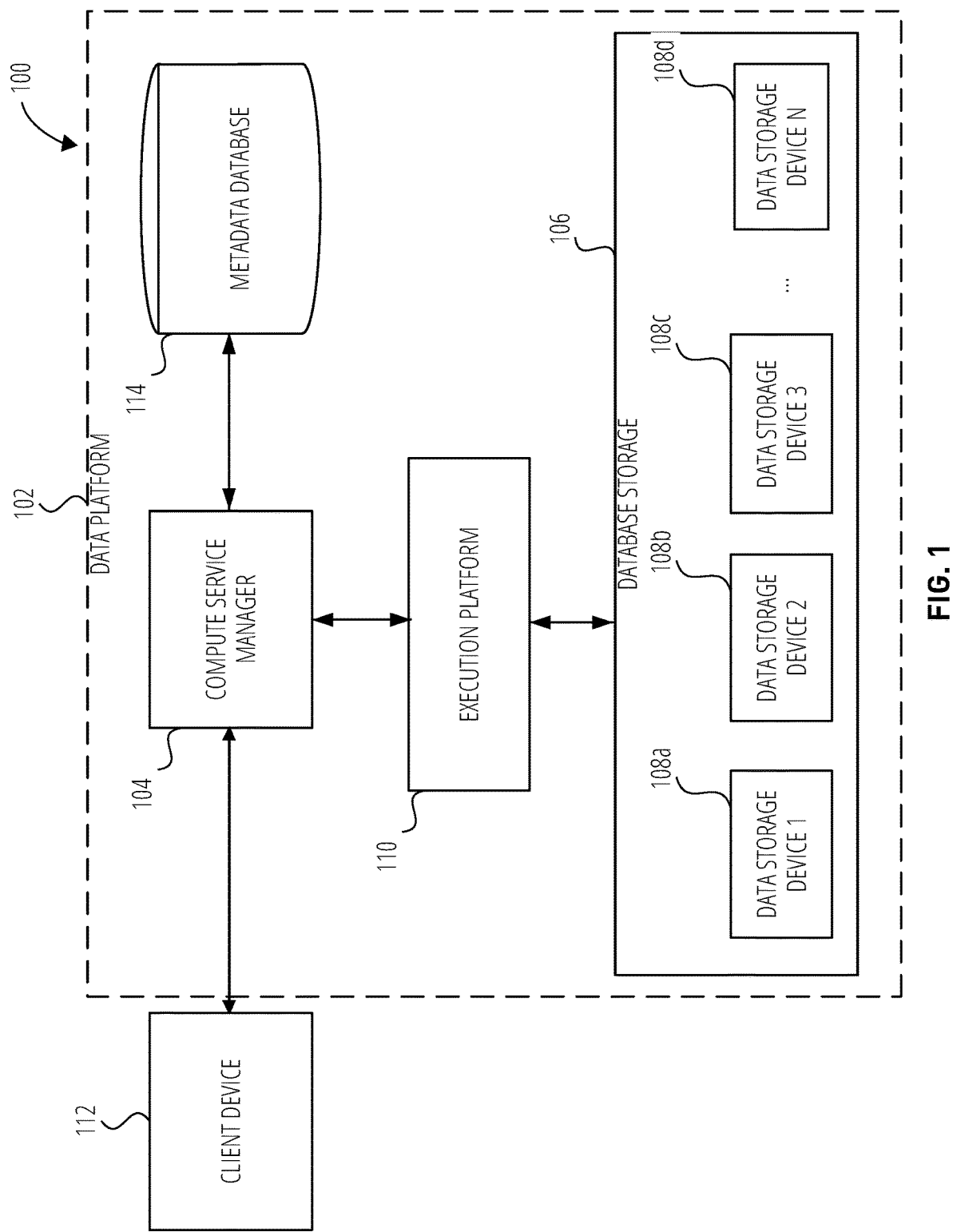
FIG. 1 illustrates an example computing environment that includes a network-based data platform in communication with a cloud storage provider system, in accordance with some examples of the present disclosure.

There are situations where a database user would like to reuse information that has been recalled from a database in multiple queries in a single session, for example when enforcing a row access policy where the policy looks up another table and uses that information to determine security behavior for policy-protected tables. Typically, there are joins introduced between the look-up table and policy-protected table and such joins can get complex and become expensive. In another example, a user may implement an expensive User Defined Functions (UDF) but the database system does not support caching a result of the UDF. A UDF becomes expensive when a compute-intensive function can be called multiple times and each time it needs to be re-computed.

Memoizable functions enhance processing by caching results opportunistically. Internally, a data platform will skip executing the function again and fetch the result directly if it is still applicable. For security policies such as row access policies, customers can leverage memoizable functions to rewrite their policy body. Using memoizable functions can avoid expensive JOINs between look-up tables and policy protected tables and improve performance.

In some examples, security policy performance is improved. For example, for a row access policy, customers can attach such a policy to a table in order to manage access to certain rows of the table. If customers have information stored in other tables that they need in order to evaluate the policy logic, several performance challenges can occur. The table can be scanned multiple times causing repeated JOIN operations being performed between the mapping tables and the policy protected table. In some cases where multiple look-up tables are involved the JOIN can become expensive. With Memoizable Functions, customers can avoid expensive JOINs and skip scanning the same mapping tables multiple times by using memoized results.

In an example as illustrated in a code fragment in Table 1 below, a row access policy, sales_policy, may be attached to a table and that table's one column is passed in as a sales_region argument. When executed, sales_policy is looking up another table, SalesManagerRegions. Every time a user queries the policy protected table sales, sales_policy evaluates the policy and introduces a join between sales and the mapping table SalesManagerRegions as illustrated in code fragment of Table 1.

TABLE 1

```
CREATE ROW ACCESS POLICY sales_policy
AS (sales_region VARCHAR)
RETURNS BOOLEAN -> (
  'sales_analyst_rl' = CURRENT_ROLE()
  OR EXISTS (
    SELECT 1 FROM Security.SalesManagerRegions
    WHERE sales_manager = CURRENT_USER()
    AND region = sales_region
  )
);
Alter table sales add row access policy sales_policy on (sales_region)
```

A memoizable functions can help for policy use cases. Initially, the logic of looking up the mapping table SalesManagerRegions can be subtracted into a separate function and creation of a memoizable function includes introducing a keyword as illustrated in the code fragment of Table 2 below.

TABLE 2

CREATE FUNCTION allowed_regions
  RETURNS ARRAY
  MEMOIZABLE
AS
$$
array_agg(SELECT region FROM Security.SalesManagerRegions
WHERE sales_manager = CURRENT_USER())
$$

The policy body is rewritten as illustrated in the code fragment of Table 3 below.

TABLE 3

CREATE ROW ACCESS POLICY Security.sales_policy
  AS (sales_region VARCHAR)
  RETURNS BOOLEAN -> (
    'sales_analyst_rl' = CURRENT_ROLE()
  OR sales_region IN allowed_regions()
);

As illustrated in the foregoing code fragments, the result for allowed_regions( ) are cached, which saves the table scan next execution of the memoizable function. When evaluating the policy body, instead of performing joins, the policy body becomes a simple look up of sales_region from an ARRAY of values and hash-join is replaced with constant-folding.

With memoizable functions, customers are allowed to supply custom logic/queries to load information, cache the loaded result and use them in other queries where only simple look up is needed by doing partition pruning instead of joins.

Several aspects of memoizable functions are summarized in Table 4 below.

TABLE 4

| Use Case | Methodology |
| --- | --- |
| Policy performance with mapping tables | Memoizable functions can be defined, loaded, cached, and reused inside policy body, skip joins, improve performance |
| Expensive functions (no arguments) | Memoizable functions allow a query using a user defined function to reuse a cache. |
| Expensive functions (constant arguments) | Memoizable functions support arguments |
| Expensive functions (non-constant arguments) | The arguments can be a table column, and the function can become a join instead of a single table scan operation. |
| Queries with user defined functions | With memoizable functions, the function portion can be cached and speed up the entire query. |

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a database storage 106, a compute service manager 104, an execution platform 110, and a metadata database 114. The database storage 106 comprises a plurality of computing machines and provides on-demand computer system resources such as data storage and computing power to the data platform 102. As shown, the database storage 106 comprises multiple data storage devices, namely data storage device 1 108a to data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the database storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the database storage 106. The data platform 102 hosts and provides data reporting and analysis services to multiple customer accounts. Administrative users can create and manage identities (e.g., users, roles, and groups) and use permissions to allow or deny access to the identities to resources and services. Generally, the data platform 102 maintains numerous customer accounts for numerous respective customers. The data platform 102 maintains each customer account in one or more storage devices of the database storage 106. Moreover, the data platform 102 may maintain metadata associated with the customer accounts in the metadata database 114. Each customer account includes multiple data objects with examples including users, roles, permissions, stages, and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple customer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. Additionally, the metadata database 114 may include information regarding how data is organized in remote data storage systems (e.g., the database storage 106) and the local caches. The metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and database storage 106 are shown in FIG. 1 as individual discrete components. However, each of the compute service manager 104, metadata database 114, execution platform 110, and database storage 106 may be implemented as a distributed system (e.g., distributed across multiple systems/platforms at multiple geographic locations). Additionally, each of the compute service manager 104, metadata database 114, execution platform 110, and database storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the database storage 106. It is desirable to retrieve as much data as possible from caches within the execution platform 110 because the retrieval speed is typically faster than retrieving data from the database storage 106.

As shown in FIG. 1, the computing environment 100 separates the execution platform 110 from the database storage 106. In this arrangement, the processing resources and cache resources in the execution platform 110 operate independently of the data storage devices 1 to N (108a, 108b, 108c, and 108d) in the database storage 106. Thus, the computing resources and cache resources are not restricted to specific data storage devices 1 to N. Instead, all computing resources and all cache resources may retrieve data from, and store data to, any of the data storage resources in the database storage 106.

Figure 2:
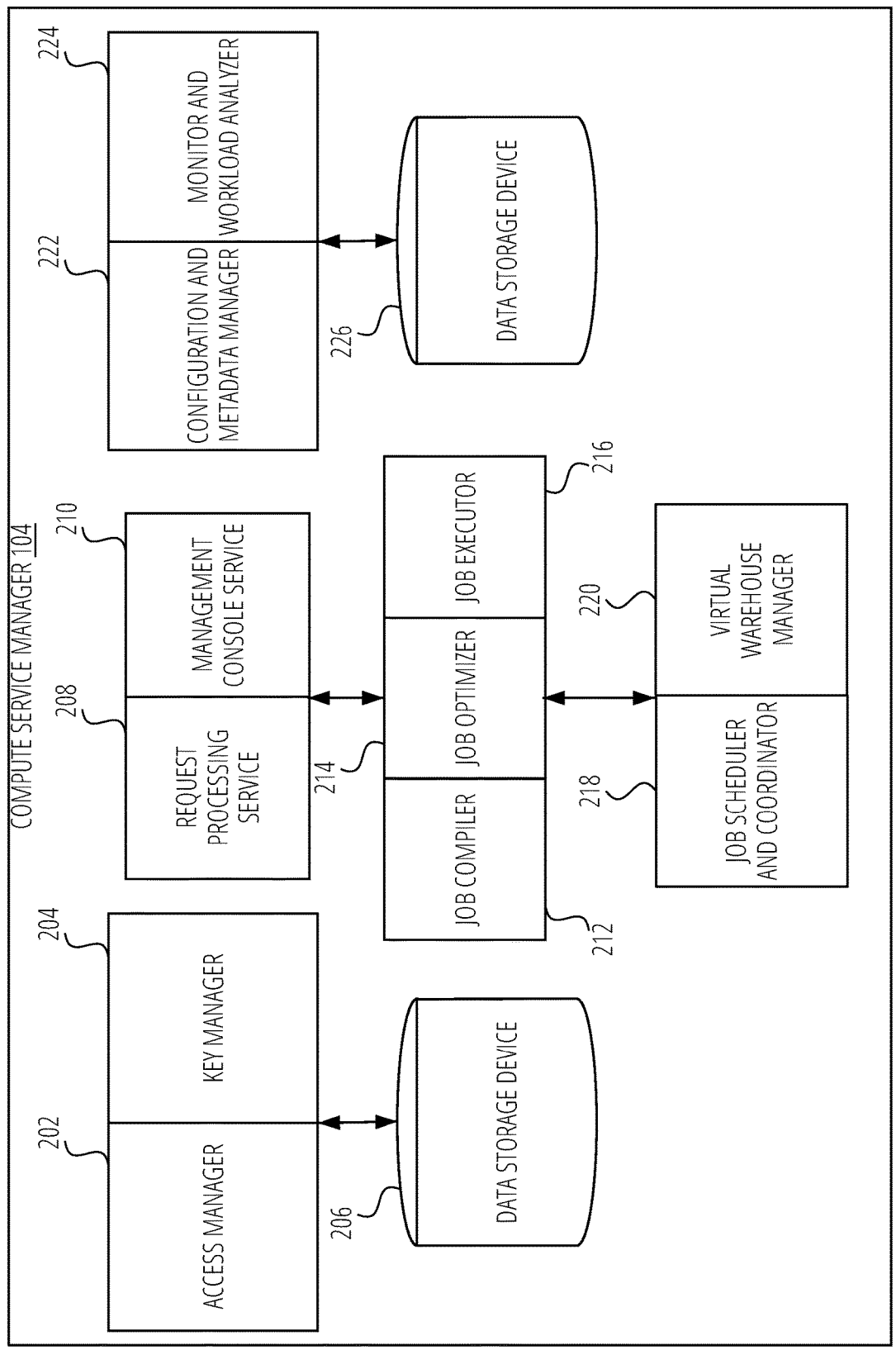
FIG. 2 is a block diagram illustrating components of a compute service manager, in accordance with some examples of the present disclosure.

FIG. 2 is a block diagram illustrating components of the compute service manager 104, in accordance with some examples of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in database storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in database storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In an example, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in database storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
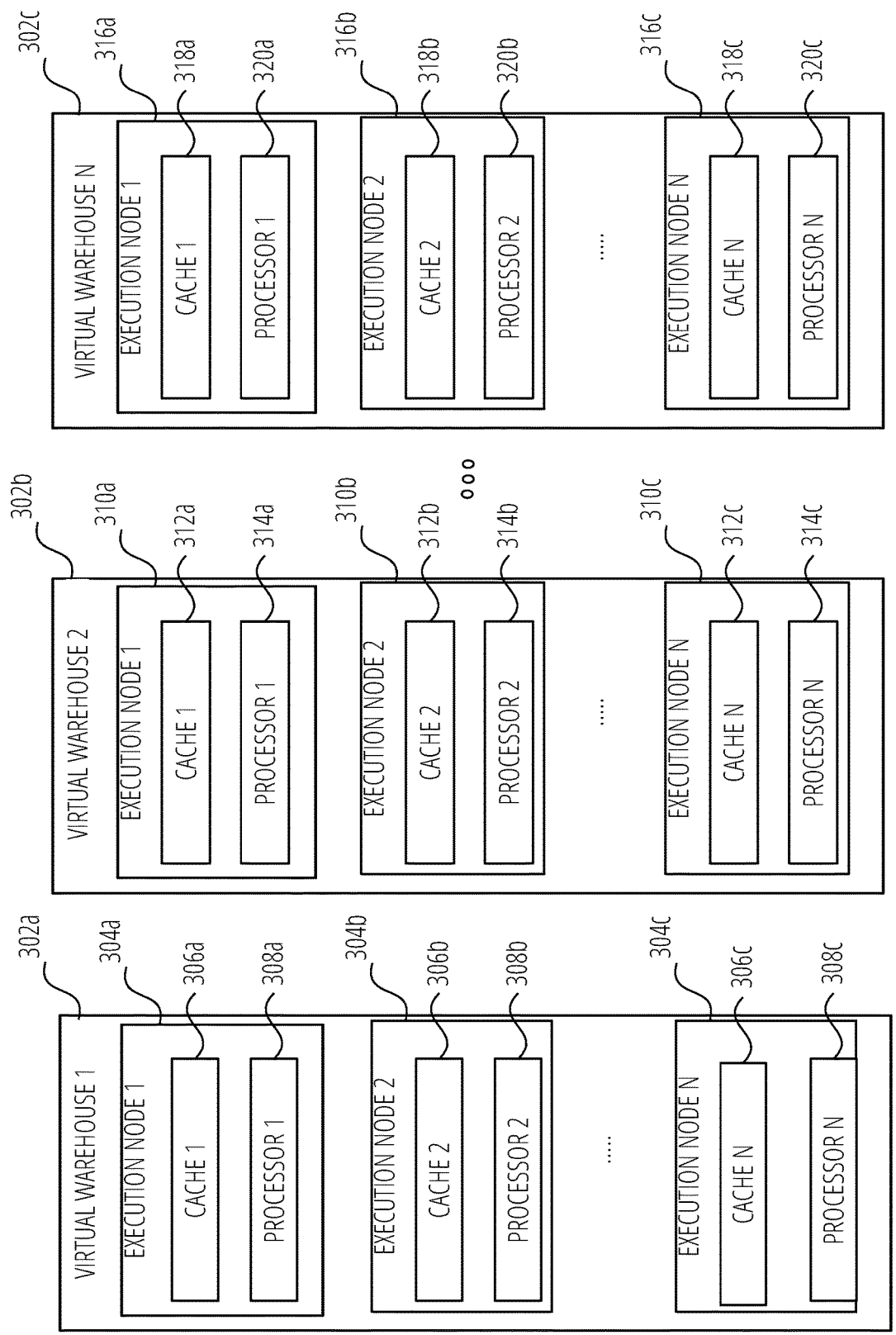
FIG. 3 is a block diagram illustrating components of an execution platform, in accordance with some examples of the present disclosure.

FIG. 3 is a block diagram illustrating components of the execution platform 110, in accordance with some examples of the present disclosure. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in database storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the database storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in database storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the database storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in database storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
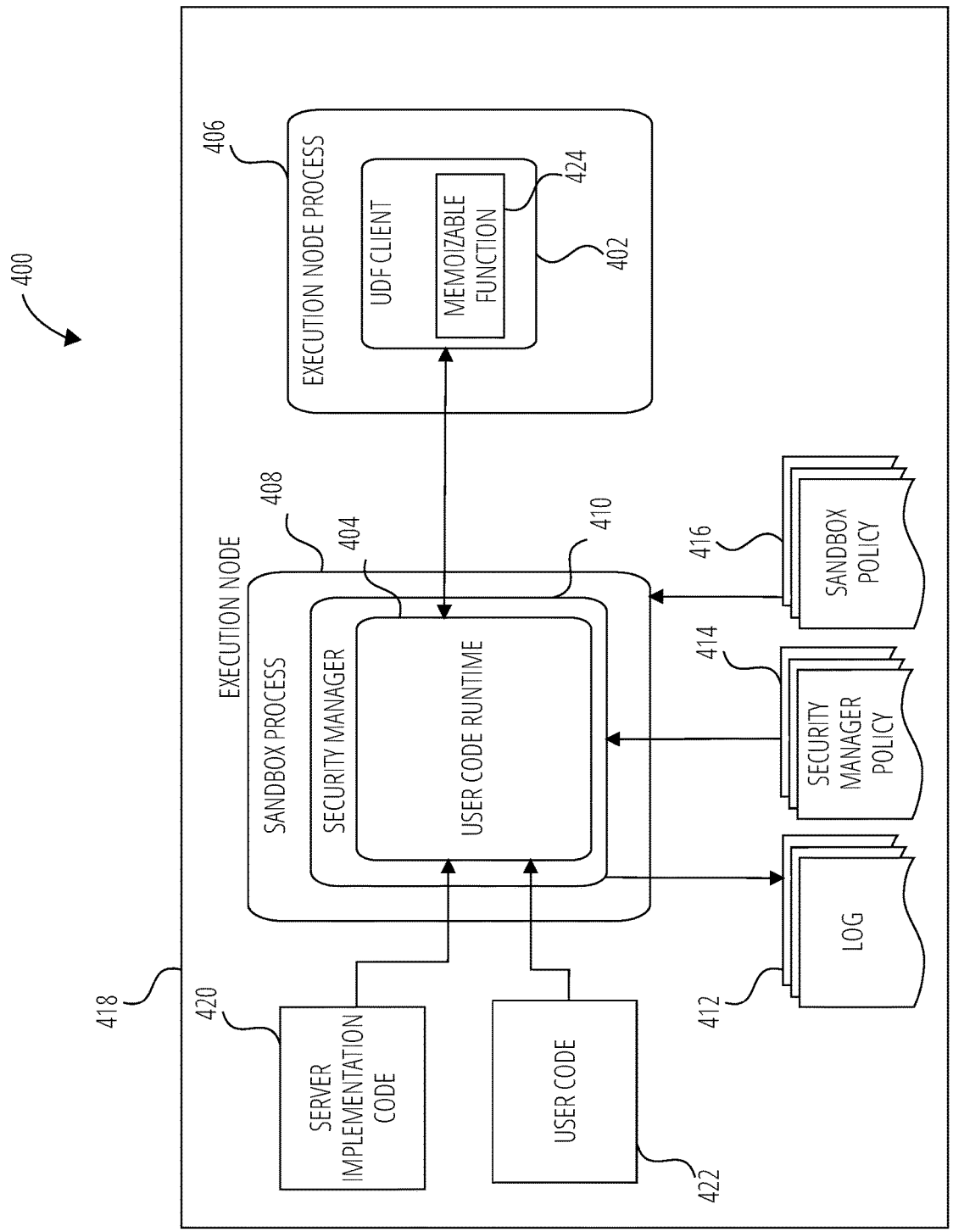
FIG. 4 is a deployment diagram of a computing environment for providing a memoizable function in accordance with some examples of the present disclosure.

FIG. 4 is a deployment diagram of a computing environment 400 for providing a memoizable function 424 in accordance with some examples. A data platform 102 utilizes the computing environment 400 to provide a secure framework for a User Defined Function (UDF) in a form of a memoizable function 424 to be performed by a UDF client 402 executed within an execution node process 406 of an execution node 418 of the data platform 102. The UDF client 402 performing the memoizable function 424 is treated by the data platform 102 as database object in that the UDF client 402 can be instantiated by function call within a database query. When instantiated, the UDF client 402 inherits all of the attributes of a database object within a database provided by the data platform 102 including permissions and restrictions that may be utilized by the data platform 102 to manage a database object.

As described in reference to FIG. 2, the compute service manager 104 implements security protocols that validate all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the database storage 106) that is not relevant to query A. In an example, an execution node 418 may need to communicate with a second execution node but the security mechanisms described herein can disallow communication with a third execution node. Moreover, any such illicit communication can be recorded (e.g., in a log 412 or other location). Further, the information stored on a given execution node is restricted to data relevant to the current query and any other data is unusable by destruction or encryption where the key is unavailable.

In some examples, the UDF client 402 is implemented to support a memoizable function 424 written in a particular programming language such as Java, and the like. In additional examples, the UDF client 402 is implemented in a different programming language (e.g., C or C++) than the user code runtime 404, which can further improve security of the computing environment 400 by using a different codebase (e.g., one without the same or fewer potential security exploits).

In some examples, the memoizable function 424 is a written in SQL. In some examples, the memoizable function 424 is written in an object-oriented language such as, but not limited to, Python interpreted by an interpreter. In some examples, the memoizable function 424 is written in an object-oriented language such as, but not limited to, Java executed by a virtual machine.

In some examples, user code 422 is provided as a package (e.g., in the form of a JAR (Java archive) file) which includes code for one or more memoizable functions. In some examples, the server implementation code 420 include instructions that initiate a server which is responsible for receiving requests from the execution node process 406, assigning worker threads to execute user code, and returning the results, among other types of server tasks.

In an implementation, an operation from a memoizable function (e.g., Java based memoizable function) can be performed by the user code runtime 404 executing within a sandbox process 408 (described further below). In some examples, the user code runtime 404 is implemented as a virtual machine, such as a Java virtual machine (JVM). Since the user code runtime 404 advantageously executes in a separate process relative to the execution node process 406, there is a lower risk of manipulating the execution node process 406. Results of performing the operation, among other types of information or messages, can be stored in a log 412 for review and retrieval. In some examples, the log 412 can be stored locally in memory at the execution node 418, or at a separate location such as the database storage 106. Moreover, such results can be returned from the user code runtime 404 to the UDF client 402 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In some examples, the UDF client 402 uses a data transport mechanism that supports a network transfer of columnar data between the user code runtime 404 (and vice-versa) with the aforementioned advantages described above.

Results of performing an operation, among other types of information or messages, can be stored in a log 412 for review and retrieval. In some examples, the log 412 can be stored locally in memory at the execution node 418, or at a separate location such as the database storage 106.

In some examples, a security manager 410, can prevent completion of an operation from the memoizable function 424 by throwing an exception (e.g., if the operation is not permitted), or returns (e.g., doing nothing) if the operation is permitted. In an implementation, the security manager 410 is implemented as a security manager object that allows an application to implement a security policy, such as security manager policy 414, and enables the application to determine, before performing a possibly unsafe or sensitive operation, what the operation is and whether it is being attempted in a security context that allows the operation to be performed. The security manager policy 414 can be implemented as a file with permissions that the user code runtime 404 is granted. The user code runtime 404 therefore can allow or disallow an operation by the memoizable function 424 based at least in part on the security policy.

In some examples, the sandbox process 408 reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 408 is a lightweight process and is optimized (e.g., closely coupled to security mechanisms of a given operating system kernel) to process a database query or other service request in a secure manner within the sandbox environment.

In some examples, the sandbox process 408 can utilize a virtual network connection in order to communicate with other components within the computing environment 400. A specific set of rules can be configured for the virtual network connection with respect to other components of the computing environment 400. For example, such rules for the virtual network connection can be configured for the memoizable function 424 to restrict the locations (e.g., particular sites on the Internet or components that the memoizable function 424 can communicate with) that are accessible by operations performed by the memoizable function 424. Thus, in this example, the memoizable function 424 can be denied access to particular network locations or sites on the Internet.

The sandbox process 408 provides a constrained computing environment for a process or processes within the sandbox, where these constrained processes can be controlled and restricted to limit access to certain computing resources.

Examples of security mechanisms can include the implementation of namespaces in which each respective group of processes executing within the constrained computing environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 408 execute as a sub-process, in some examples, latency in processing a given database query can be substantially reduced in comparison with other techniques that may utilize a virtual machine solution by itself.

As further illustrated, the sandbox process 408 can utilize a sandbox policy 416 to enforce a given security policy. The sandbox policy 416 can be a file with information related to a configuration of the sandbox process 408 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 408 restricts the memory and processor (e.g., CPU) usage of the user code runtime 404, ensuring that other operations on the same execution node can execute without running out of resources.

During operation, the execution node 418 receives, in the execution node process 406, a memoizable function 424, the memoizable function 424 includes code related to at least one operation to be performed. For example, the memoizable function 424 includes code for a database operation to be performed. The execution node 418 sends a request based at least in part on the at least one operation to the sandbox process 408 to perform, the sandbox process 408 being different than the execution node process 406 and comprising a sandbox for executing the at least one operation, the execution node process 406 and the sandbox process 408 being executed on the execution node 418 of the execution platform 110. Alternatively, the execution node process 406 and the sandbox process 408 can execute in different execution nodes of the execution platform 110 In some examples, the UDF client 402 can send the request directly to a virtual machine (e.g., user code runtime 404) executing in the sandbox process 408. The execution node 418 receives, by the sandbox process 408, the request. In an example, the sandbox process 408 can forward the request to a virtual machine (e.g., the user code runtime 404) for processing. In some examples the request is sent directly to the user code runtime 404 from the UDF client 402 executing in the execution node process 406. The execution node 418 determines, using at least a security manager policy 414, whether performing the at least one operation is permitted. In some examples the security manager 410, using the security manager policy 414, can determine whether the operation is permitted. Alternatively or conjunctively, the sandbox process 408 using the sandbox policy 416 can determine whether the operation is permitted. In some examples, the operation is performed/executed, and subsequently the execution node 418 makes a determination whether the operation is permitted under the security manager policy 414 and/or the sandbox policy 416. In some examples, where at least a portion of the operation is not permitted under a given policy, the execution node 418 can cease or abort the completion of the operation in progress, or if the operation has completed then perform steps to revert the operation. In this manner, the sandbox process 408 can provide multiple layers of security based on the security manager policy 414 and the sandbox policy 416. The execution node 418 performs, in the sandbox process 408, the at least one operation in response to the operation being permitted. Alternatively, as described before, an exception (e.g., error notification or programmatically determined error message, and the like) can be returned instead if the operation is determined to not be permitted based on the security manager policy 414.

The execution node 418 sends, by the sandbox process 408, a result of the at least one operation to the execution node process 406. In some examples, the user code runtime 404 executing in the sandbox process 408 returns the result of the operation directly to the UDF client 402 in the execution node process 406. The result is then received by the execution node process 406 (e.g., for additional processing).

In some examples, the memoizable function 424 is executed directly by the user code runtime 404 without the aid of the execution node process 406 or the UDF client 402.

Although the above discussion of FIG. 4 describes components that are implemented using Java (e.g., object oriented programming language), it is appreciated that the other programming languages (e.g., interpreted programming languages) are supported by the computing environment 400. In some examples, Python is supported for implementing and executing memoizable functions in the computing environment 400. In this example, the user code runtime 404 can be replaced with a Python interpreter for executing operations from memoizable functions (e.g., written in Python) within the sandbox process 408.

Figure 5:
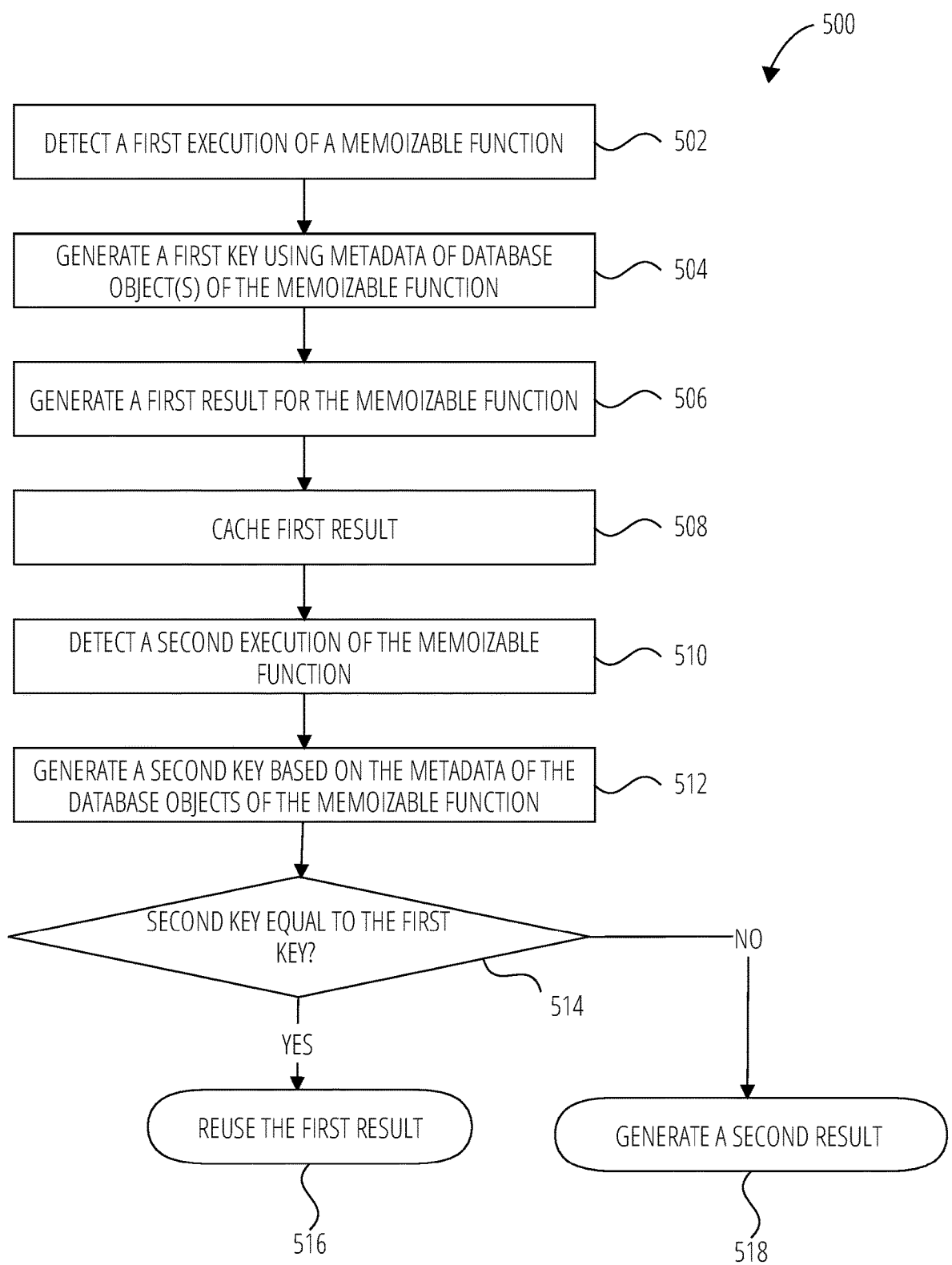
FIG. 5 illustrates a process used by a compute service manager when executing a memoizable function in accordance with some examples of the present disclosure.

FIG. 5 illustrates a method 500 used by an execution platform 110 when executing a memoizable function in accordance with some examples. With memoizable functions, users can dissect interesting parts of a complex query and use them across different queries. The execution platform 110 executes the memoizable function in a separate child job, caches the function result, and applies the result back into the query which uses the memoizable function. Accordingly, memoizable functions provide a mechanism that allows user to supply custom logic/queries to load information, cache the loaded results and use them in other queries where only simple look up is needed by doing partition pruning instead of joins.

In some examples, the execution platform 110 applies an interleaved execution workflow for a memoizable function execution meaning that the execution platform 110 launches a separate child job created specifically to execute the memoizable function. When executing a memoizable function in a query, the execution platform 110 creates a separate child job to execute the memoizable function, caches the result of the executed memoizable function, and plugs the result back into the original job.

In order to do so, in operation 502, the execution platform 110 detects an initial (first) execution of a memoizable function 424 in a query. For example, on a current execution of the memoizable function 424, the execution platform 110 determines if there are results cached from a previous execution of the memoizable function 424. If there are no cached results from a previous execution of the memoizable function 424, then the execution platform 110 treats the current execution of the memoizable function 424 as an initial (first) execution of the memoizable function 424.

In operation 504, on the basis of detecting the first execution of a memoizable function 424, the compute service manager 104 generates an initial (first) key based on metadata of one or more database objects operated on by the memoizable function 424. In some examples, the metadata of the one or more database objects used to generate a key may include, but is not limited to, a modification history, version information, and ownership information of the one or more database objects. Keys generated from the metadata are used to determine if the one or more database objects have been modified from a time of execution of the memoizable function 424 and a subsequent execution of the memoizable function 424, thus invalidating any cached result of the previous execution of the memoizable function 424. In some examples, the key is generated based further on a user identification of a user who has ownership of the process that is executing the memoizable function 424.

In operation 506, the execution platform 110 executes the memoizable function 424 and generates an initial (first) result for the memoizable function 424 based on the one or more database objects operated on by the memoizable function 424.

In operation 508, the execution platform 110 caches the initial (first) result and the initial (first) key. In some examples, the initial (first) result and the initial (first) key are cached in an indexable datastore where the initial (first) key is used as index to locate and recall the initial (first) result.

In operation 510, the execution platform 110 detects a subsequent (second) execution of the memoizable function 424. For example, the execution platform 110 determines if there is a cached result for the memoizable function 424. If so, the execution platform 110 treats the current execution of the memoizable function 424 as a second execution of the memoizable function 424.

The execution platform 110 determines the validity of the cache of the initial (first) result before the execution platform 110 determines to reuse the initial (first) result. To do so, in operation 512, on the basis of detecting the subsequent (second) execution of the memoizable function 424, the execution platform 110 generates a subsequent (second) key based on the one or more database objects operated on by the memoizable function 424.

In operation 516, on the basis of determining the subsequent (second) key is equal to the initial (first) key in operation 514, the execution platform 110 reuses the initial (first) result of the first execution as a subsequent (second) result for the subsequent (second) execution of the memoizable function 424.

In operation 518, on the basis of determining the subsequent (second) key is not equal to the initial (first) key in operation 514, the execution platform 110 executes the memoizable function 424 and generates the subsequent (second) result for the subsequent (second) execution of the memoizable function 424 based on the one or more database objects. In some examples, The execution platform 110 determines the initial (first) result is reusable on the basis of determining that the subsequent (second) key is equal the initial (first) key indicating that the one or more database objects have not changed since the initial (first) execution of the memoizable function 424. The execution platform 110 determines the initial (first) result is not reusable on the basis of determining that the subsequent (second) key is not equal the initial (first) key indicating that the one or more database objects have changed since the initial (first) execution of the memoizable function 424.

In some examples, the execution platform 110, on the basis of determining that a memory requirement of a result of the memoizable function 424 is below a memory storage size limit, caches the key associated with the result and the result. On the basis of determining that a memory requirement of a result is above a memory storage size limit, the execution platform 110 does not cache the key associated with the result and the result.

In some examples, the execution platform 110 launches a child job to perform the initial (first) execution of the memoizable function 424.

In some examples, in operation 518, on the basis of determining the subsequent (second) key is not equal to the initial (first) key in operation 514, the execution platform 110 launches a child job and the child job executes the memoizable function 424 and generates the subsequent (second) result for the subsequent (second) execution of the memoizable function 424 based on the one or more database objects.

In some examples, the memoizable function 424 is executed within a security context of the data platform based on a security policy of the data platform.

In some examples the memoizable function 424 is executed as part of an implementation of a security policy.

While memoizable functions can be used like a non-memoizable memoizable functions in a query, the "MEMO-IZABLE" keyword indicates to the execution platform 110 to treat the memoizable function 424 differently compared to non-memoizable functions. In some examples, the execution platform 110 executes the memoizable function and detects the MEMOIZABLE keyword and caches the result of the memoizable function opportunistically.

In some examples, a memoizable function 424 may be used as part of a policy. For example, the execution platform 110 detects a memoizable function 424 being used inside policy, and the execution platform 110 launches a separate job to execute the memoizable function. Once the result is returned from the separate job, after it is cached, a query plan is rewritten in a way that the previously returned result can be used to eliminate one or more operations as a simple lookup, which boosts performance.

In some examples, memoizable functions have zero arguments. In some examples, memoizable functions are SQL functions that return a scalar value.

In some examples, if the memoizable function returns a result list that is too large and a memory size limit is imposed. If the size limit is exceeded, an error is thrown, indicating that the function result is too large. Alternatively, an error is not thrown, instead the operation is continued without optimization.

In some examples, cached results of an execution of the memoizable function 424 persist across multiple sessions.

In some examples, if the memoizable function 424 queries a table but that table gets updated subsequently, the next time the memoizable function 424 executes, the previous cache will be invalidated.

Figure 6:
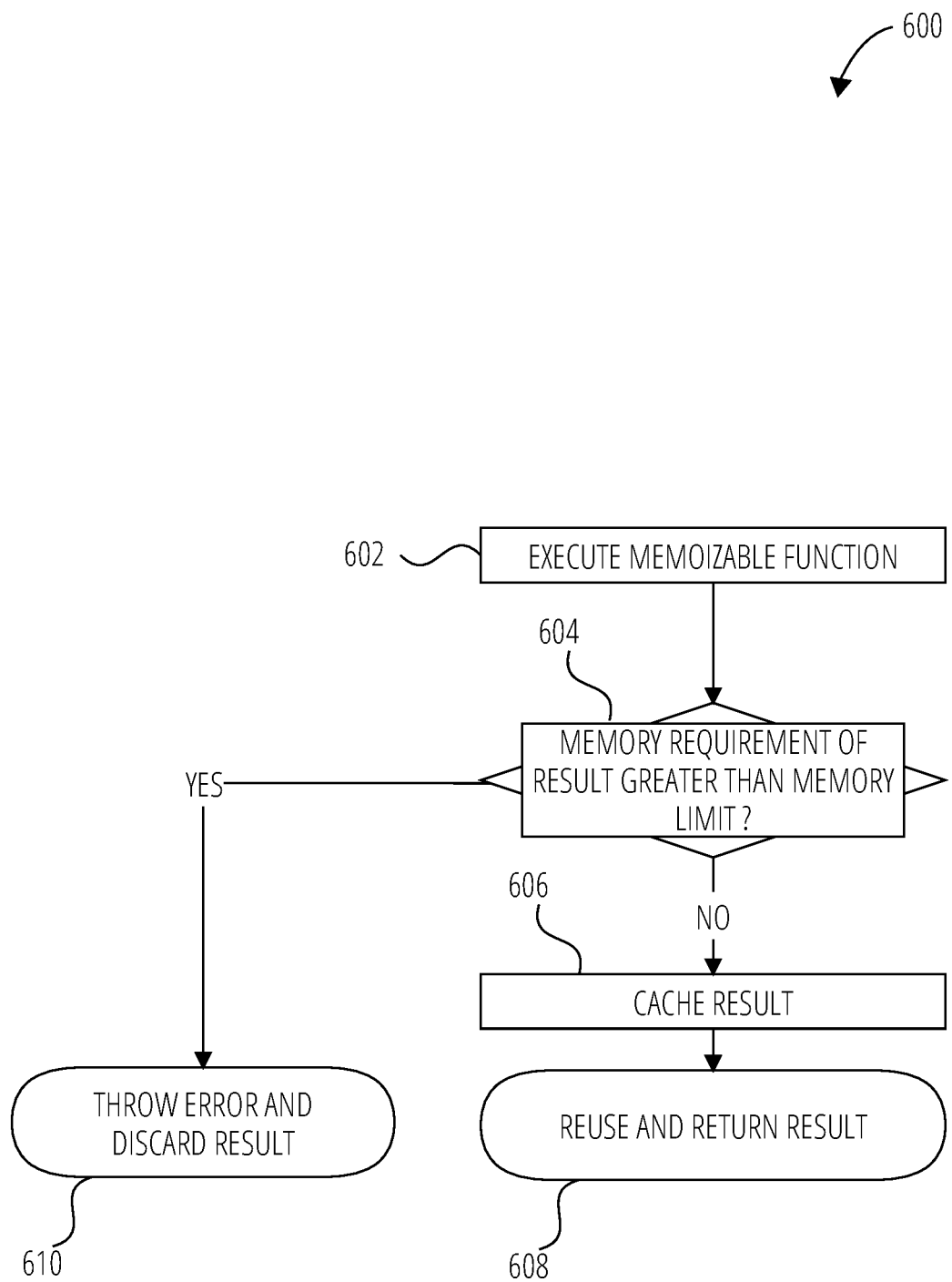
FIG. 6 is a process flow diagram of a child job process used by a compute service manager to execute a memoizable function in a child job of the compute service manager in accordance with some examples of the present disclosure.

FIG. 6 is a process flow diagram of a child job process 600 used by a compute service manager 104 to execute a memoizable function 424 in a child job of the execution platform 110 in accordance with some examples. Child jobs are used by a process to execute a memoizable function during evaluation of query that includes a memoizable function.

In operation 602, the execution platform 110 executes the memoizable function 424 and generates a result based on one or more database objects of the memoizable function 424.

In operation 604, the execution platform 110 determines if a memory requirement for caching the result of the memoizable function 424 of result greater than a memory limit. On the basis of determining that the memory requirement for caching the result of the memoizable function 424 of result is greater than the memory limit, the execution platform 110 discards the result in operation 610 and throws an error. In some examples, in operation 610 the child job process 600 returns the result of the execution of the memoizable function 424 along with an error code.

In operation 606, on the basis of determining that the memory requirement for caching the result of the memoizable function 424 of result is not greater than the memory limit, the compute service manager 104 caches the result of the execution of the memoizable function 424. In operation 608, the 104 returns the result of the execution of the memoizable function 424.

In some examples, content for the child job is generated based on the body of the memoizable function 424. For example, the compute service manager 104 generates the child one on the basis of a SQL select statements operating on the body of the memoizable function 424. In further examples, a name of the memoizable function 424 is resolved in the parent job into an ID, and generate SQL text "select identifier(?) (?, ?, ? . . . )" which would be the child job content. The binds are used for argument support. Using this process, the child job does not resolve the memoizable function 424 again, but expands and resolves the body of the memoizable function 424. In many examples, SQL text or a parse tree may be used.

In some examples, the compute service manager 104 launches the child job during a constant folding when a query is compiled by the job compiler 212 of the compute service manager 104. The child job is launched for the memoizable function 424 and the returned result of the child job is used as the result of the constant folding operation.

In some examples, the memoizable function 424 is not expanded in the parent job by the job compiler 212, instead the memoizable function body is expanded in the child job, and once the child job completes, job compiler 212 returns to the parent job and replaces the function node with the result of the memoizable function 424 such as, but not limited to, a scalar value.

In some examples, a context is passed to the child job. The context includes, but is not limited to, a parent view, policy, or function context including a schema, identification, owner, a shared status, etc.

In some examples, the child job is executed on a same global service instance as the parent job. If there are more than one memoizable functions that require child job creation, the job compiler 212 will create and execute them sequentially.

In some examples, once the child job completes and its result reuse cache is created, a global service returns to the parent job's constant folding stage where the child is initialized. A query result cached object of the result value of the child job is fetched and parsed. Next time the same memoizable function gets executed, a second child job with the same SQL text will be created but the previously created result reuse cache is returned as the result of the second child job.

In some examples, a memory size limit for the child job is 100 kb.

In some examples, a memoizable function can be a recursive function.

Figure 7:
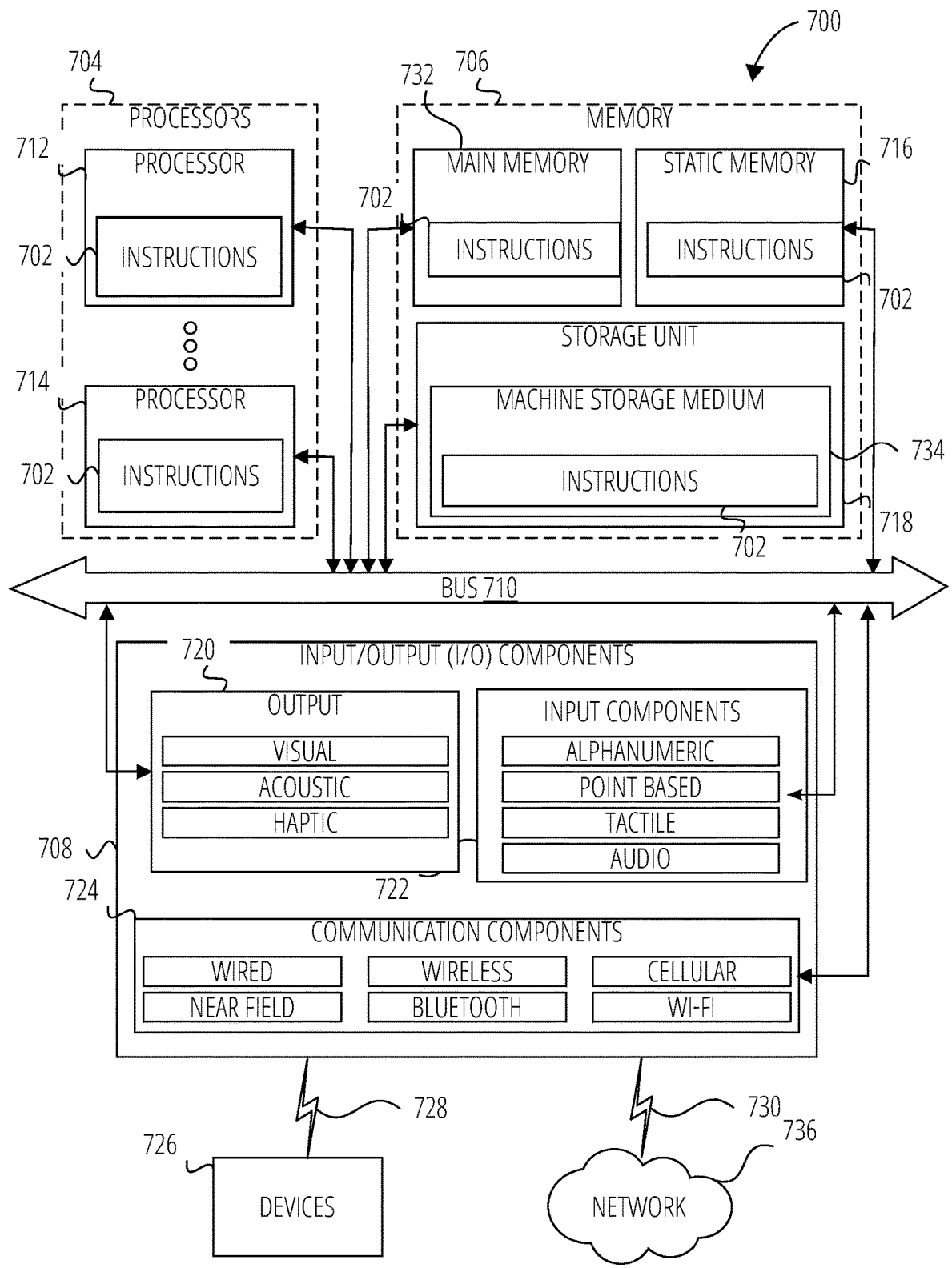
FIG. 7 illustrates a diagrammatic representation of a machine in the form of a computer system within which a set of instructions may be executed for causing the machine to perform any one or more of the methodologies discussed herein, in accordance with some examples of the present disclosure.

FIG. 7 illustrates a diagrammatic representation of a machine 700 in the form of a computer system within which a set of instructions may be executed for causing the machine 700 to perform any one or more of the methodologies discussed herein, according to examples. Specifically, FIG. 7 shows a diagrammatic representation of the machine 700 in the example form of a computer system, within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 1 to N of database storage 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes processors 704, memory 706, and I/O components 708 configured to communicate with each other such as via a bus 710. In an example, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, all accessible to the processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the database storage 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

What is claimed is:

1. A computer-implemented method comprising:
   detecting a first execution of a user-defined function (UDF);
   generating a first key based on metadata of one or more database objects operated on by the UDF, the metadata comprising a modification history of the one or more database objects;
   generating a first result for the first execution of the UDF based on the one or more database objects;
   storing the first key and the first result;
   detecting a second execution of the UDF;
   generating a second key based on the metadata of the one or more database objects;
   based on determining the second key matches the first key, reusing the stored first result for the second execution of the UDF; and
   based on determining the second key does not match the first key, generating a second result for the second execution of the UDF based on the one or more database objects.

2. The computer-implemented method of claim 1, wherein the operations of storing the first key and the first result further comprise:
   based on determining that a memory requirement of the first result is below a memory storage limit, caching the first key and the first result; and
   based on determining that the memory requirement of the first result is above a memory storage limit, not caching the first key and the first result.

3. The computer-implemented method of claim 1, wherein operations of the first execution comprise:
   launching a child job to perform the first execution.

4. The computer-implemented method of claim 3, wherein operations of launching the child job comprise:
   expanding a body of the UDF in the child job; and
   replacing a function node with a result of the UDF.

5. The computer-implemented method of claim 3, wherein operations of launching the child job comprise:
   instantiating a virtual machine and allocating computing resources for executing the UDF.

6. The computer-implemented method of claim 3, wherein operations of launching the child comprise:
   performing the first execution within a security context of a data platform based on a security policy of the data platform.

7. The computer-implemented method of claim 6, wherein the security policy comprises a security manager policy enforced by a security manager of the data platform.

8. The computer-implemented method of claim 7, wherein the security policy comprises a sandbox policy enforced by a sandbox process of the data platform.

9. The computer-implemented method of claim 1, wherein the stored first result persists across multiple sessions.

10. The computer-implemented method of claim 1, wherein the modification history comprises timestamps associated with modifications to the one or more database objects.

11. A machine comprising:
    one or more processors; and
    one or more memories storing instructions that, when executed by the one or more processors, cause the machine to perform operations comprising:
    detecting a first execution of a user-defined function (UDF);
    generating a first key based on metadata of one or more database objects operated on by the UDF, the metadata comprising a modification history of the one or more database objects;
    generating a first result for the first execution of the UDF based on the one or more database objects;
    storing the first key and the first result;
    detecting a second execution of the UDF;
    generating a second key based on the metadata of the one or more database objects;
    based on determining the second key matches the first key, reusing the stored first result for the second execution of the UDF; and
    based on determining the second key does not match the first key, generating a second result for the second execution of the UDF based on the one or more database objects.

12. The machine of claim 11, wherein the operations of storing the first key and the first result further comprise:
    based on determining that a memory requirement of the first result is below a memory storage limit, caching the first key and the first result; and
    based on determining that the memory requirement of the first result is above a memory storage limit, not caching the first key and the first result.

13. The machine of claim 11, wherein operations of the first execution comprise:
    launching a child job to perform the first execution.
14. The machine of claim 13, wherein operations of launching the child job comprise:
    expanding a body of the UDF in the child job; and
    replacing a function node with a result of the UDF.
15. The machine of claim 13, wherein operations of launching the child job comprise:
    instantiating a virtual machine and allocating computing resources for executing the UDF.
16. The machine of claim 13, wherein operations of launching the child comprise:
    performing the first execution within a security context of a data platform based on a security policy of the data platform.
17. The machine of claim 16, wherein the security policy comprises a security manager policy enforced by a security manager of the data platform.
18. The machine of claim 17, wherein the security policy comprises a sandbox policy enforced by a sandbox process of the data platform.
19. The machine of claim 11, wherein the stored first result persists across multiple sessions.
20. The machine of claim 11, wherein the modification history comprises timestamps associated with modifications to the one or more database objects.
21. A machine-storage medium storing instructions that, when executed by the machine, cause the machine to perform operations comprising:
    detecting a first execution of a user-defined function (UDF);
    generating a first key based on metadata of one or more database objects operated on by the UDF, the metadata comprising a modification history of the one or more database objects;
    generating a first result for the first execution of the UDF based on the one or more database objects;
    storing the first key and the first result;
    detecting a second execution of the UDF;
    generating a second key based on the metadata of the one or more database objects;
    based on determining the second key matches the first key, reusing the stored first result for the second execution of the UDF; and
    based on determining the second key does not match the first key, generating a second result for the second execution of the UDF based on the one or more database objects.
22. The machine-storage medium of claim 21, wherein the operations of storing the first key and the first result further comprise:
    based on determining that a memory requirement of the first result is below a memory storage limit, caching the first key and the first result; and
    based on determining that the memory requirement of the first result is above a memory storage limit, not caching the first key and the first result.
23. The machine-storage medium of claim 21, wherein operations of the first execution comprise:
    launching a child job to perform the first execution.
24. The machine-storage medium of claim 23, wherein operations of launching the child job comprise:
    expanding a body of the UDF in the child job; and
    replacing a function node with a result of the UDF.
25. The machine-storage medium of claim 23, wherein operations of launching the child job comprise:
    instantiating a virtual machine and allocating computing resources for executing the UDF.
26. The machine-storage medium of claim 23, wherein operations of launching the child comprise:
    performing the first execution within a security context of a data platform based on a security policy of the data platform.
27. The machine-storage medium of claim 26, wherein the security policy comprises a security manager policy enforced by a security manager of the data platform.
28. The machine-storage medium of claim 27, wherein the security policy comprises a sandbox policy enforced by a sandbox process of the data platform.
29. The machine-storage medium of claim 21, wherein the stored first result persists across multiple sessions.
30. The machine-storage medium of claim 21, wherein the modification history comprises timestamps associated with modifications to the one or more database objects.

* * * * *